United States Patent
Bishop

(10) Patent No.: US 9,803,369 B2
(45) Date of Patent: Oct. 31, 2017

(54) FLEXIBLE CLADDING WRAP, SYSTEM AND METHODS

(71) Applicant: Paul James Bishop IP Holdings Limited, Birmingham (GB)

(72) Inventor: Paul Bishop, Gloucestershire (GB)

(73) Assignee: Paul James Bishop IP Holdings Limited, Birmingham (GB)

( * ) Notice: Subject to any disclaimer, the term of this patent is extended or adjusted under 35 U.S.C. 154(b) by 0 days.

(21) Appl. No.: 15/304,387

(22) PCT Filed: Apr. 14, 2015

(86) PCT No.: PCT/GB2015/051139
§ 371 (c)(1),
(2) Date: Oct. 14, 2016

(87) PCT Pub. No.: WO2015/159075
PCT Pub. Date: Oct. 22, 2015

(65) Prior Publication Data
US 2017/0037636 A1   Feb. 9, 2017

(30) Foreign Application Priority Data

Apr. 15, 2014   (GB) .................................. 1406773.0
Apr. 17, 2014   (GB) .................................. 1406997.5

(51) Int. Cl.
*E04F 13/14*   (2006.01)
*E04F 13/00*   (2006.01)
(Continued)

(52) U.S. Cl.
CPC .............. *E04F 13/002* (2013.01); *B32B 3/14* (2013.01); *B32B 5/024* (2013.01); *B32B 5/16* (2013.01);
(Continued)

(58) Field of Classification Search
CPC .. E04F 13/147; E04F 13/0862; B28B 7/0073; B28B 23/0006; B28B 7/007; B28B 19/0061
See application file for complete search history.

(56) References Cited

U.S. PATENT DOCUMENTS 1,436,914 A   11/1922   Seigle
1,574,890 A   3/1926   Hofmann
(Continued)

FOREIGN PATENT DOCUMENTS

CH   512322 A   9/1971
CN   2490253 Y   5/2002
(Continued)

OTHER PUBLICATIONS

Search Report and Written Opinion for related PCT Application No. PCT/GB2015/051139, 5 pages, dated Aug. 11, 2015.
(Continued)

*Primary Examiner* — Rodney Mintz
*Assistant Examiner* — Daniel Kenny
(74) *Attorney, Agent, or Firm* — Hovey Williams LLP

(57) ABSTRACT

A flexible cladding wrap (10) for an exterior or interior wall of a building, a building wall panel, and/or a building surface is provided, the flexible cladding wrap (10) comprising a flexible facing layer (16) including a, preferably absorbent and more preferably porous, flexible facing substrate (22) and powdered aggregate (24) bonded to the facing substrate (22); and a flexible backing layer (12) including a flexible backing substrate (20) to which the facing layer is attached. A system utilizing said flexible cladding wrap (10) to create a continuous aesthetic impression of the building is also provided, in addition to methods of making and using said flexible cladding wrap (10).

7 Claims, 8 Drawing Sheets

(51) Int. Cl.
  *E04F 13/08* (2006.01)
  *B32B 5/02* (2006.01)
  *B32B 5/16* (2006.01)
  *B32B 5/22* (2006.01)
  *B32B 5/26* (2006.01)
  *B32B 5/30* (2006.01)
  *B32B 13/14* (2006.01)
  *B32B 3/14* (2006.01)
  *D06N 7/00* (2006.01)
  *B32B 7/12* (2006.01)

(52) U.S. Cl.
  CPC ............ *B32B 5/22* (2013.01); *B32B 5/26* (2013.01); *B32B 5/30* (2013.01); *B32B 7/12* (2013.01); *B32B 13/14* (2013.01); *D06N 7/0026* (2013.01); *E04F 13/0862* (2013.01); *E04F 13/0873* (2013.01); *E04F 13/147* (2013.01); *B32B 2260/021* (2013.01); *B32B 2260/025* (2013.01); *B32B 2260/046* (2013.01); *B32B 2262/02* (2013.01); *B32B 2262/0253* (2013.01); *B32B 2262/062* (2013.01); *B32B 2264/10* (2013.01); *B32B 2307/546* (2013.01); *B32B 2307/712* (2013.01); *B32B 2307/718* (2013.01); *B32B 2607/00* (2013.01)

(56) References Cited

U.S. PATENT DOCUMENTS 3,991,529 A * 11/1976 Terwilliger ............ B44F 11/06
                                                       428/43
5,927,034 A * 7/1999 Cole ...................... B29C 67/243
                                                       428/41.8
6,237,294 B1   5/2001 Rygiel
7,527,236 B2 * 5/2009 Nasvik .................. B28B 7/0073
                                                       249/16
7,735,277 B1 * 6/2010 Everhart ............... E04F 13/16
                                                       52/314
9,556,619 B2 * 1/2017 Hunsaker ............ E04F 13/0733
9,562,360 B2 * 2/2017 Brailsford ........... E04F 13/0871
2002/0100241 A1 8/2002 Rygiel
2008/0276562 A1* 11/2008 Stuchell ................ B29C 70/64
                                                       52/596

FOREIGN PATENT DOCUMENTS

DE   1805227 A1   7/1970
EP   0879256 A1   8/1997
WO   2011082491 A1  7/2011

OTHER PUBLICATIONS

British Examination Report of related Application No. GB1406997.5; dated Jan. 20, 2015; 6 pages.

British Examination Report of related Application No. GB1406997.5; dated Oct. 28, 2015; 2 pages.

British Examination Report of related Application No. GB1406997.5; dated Aug. 15, 2016; 2 pages.

* cited by examiner

FLEXIBLE CLADDING WRAP, SYSTEM AND METHODS

RELATED APPLICATIONS

This application is a national stage application, under 35 U.S.C. §371 of International Patent Application No. PCT/GB2015/051139, filed on Apr. 14, 2015 and published as WO 2015/159075 on Oct. 22, 2015, which claims priority to Great Britain Application No. 1406773.0 filed Apr. 15, 2014 and GB Application No. 1406997.5, filed Apr. 17, 2014, which are hereby incorporated by reference in their entirety.

The present invention relates to a flexible cladding wrap, a flexible facing layer for said wrap, and a cladding system, particularly but not necessarily exclusively for an exterior or interior wall of a building, a building wall panel, and/or building surface using such a wrap. The invention furthermore relates to a method of forming such a flexible facing layer and cladding wrap, and to a method of creating an aesthetically pleasing façade for a building using said wrap.

Cladding for buildings, such as domestic and commercial premises, is known, and traditionally comes in individual tiles which are laboriously applied by hand to the exterior wall of the building, before then being grouted. However, the tiles first have to be produced, and these may either be moulded plastics, which are low-cost and have minimal longevity, or may be sliced from pre-manufactured brick. This latter case is hugely wasteful, since only the outer surface is required and thus around 90% of the brick is then discarded, typically being disposed of in landfill.

Other options for cladding exist, such as plaster or render stucco material. However, such outer layers on buildings are prone to cracking over a relatively short period of time due to the impact of seasonal climate change, along with relatively rapid fading.

Furthermore, current cladding is highly repetitive, leading to a clearly unnatural finish and one which cannot be matched to the surrounding built and historical environment.

It is known to provide paneled cladding for a building, wherein an outwardly facing layer of the cladding can be matched to the finish of the building. However, rigid panels can only be integrated onto surfaces with certain characteristics. If the external walls of a building are in a state of disrepair, for instance, it may not be possible to apply a rigid panel which displays a natural finish. This can be a significant problem for the restoration of historic buildings, where the walls may not have entirely uniform features.

The present invention seeks to overcome all of these problems.

According to a first aspect of the invention, there is provided a flexible cladding wrap for an exterior wall of a building, the flexible cladding wrap comprising: a flexible facing layer including an absorbent flexible facing substrate and powdered aggregate bonded to the facing substrate; and a flexible backing layer including a flexible backing substrate to which the facing layer is attached.

Preferably, the cladding wrap can be applied to and follows contoured surfaces.

It is an object of the invention to provide a versatile façade for a building which has a brick- or stone-work effect, which can be readily applied to the exterior of said building without obviously altering the overall appearance of the building. Given that many buildings do not necessarily have perfectly planar exterior walls, the flexibility of the cladding wrap allows for it to be adhered to non-planar surfaces or severely undulating surfaces which may not be able to accept paneled cladding.

The flexibility of the cladding wrap means that a variety of different surfaces can be repaired or renovated in an aesthetically fitting manner, keeping the overall appearance of the building the same during cladding application. The cladding can also be used to create a new overall aesthetic appearance for a building, in particular a building having unusual contours.

The cladding wrap is also easily applied to a support surface, since it can be rolled out at will, is light and easily manipulated. The flexibility of the cladding wrap also increases its versatility when compared with rigid cladding panels.

Using rigid cladding panels, as are known in the field of the art, it is possible to create contours by scoring the rear faces of said rigid panels. However, there is clearly a limit to the contouring achievable using such panels, and some shapes will evidently not be possible to manufacture. A flexible cladding wrap circumvents this issue.

By using preferably absorbent and/or porous substrates, the underlying brick or stone of the exterior wall is able to breathe through the flexible cladding wrap, whilst retaining a traditional-built appearance. This inhibits the build-up of damp or mould in the brick- or stone-work, which may otherwise occur with historic or older buildings.

Preferably, the powdered aggregate may be recycled from castoff solid inorganic material, and may be at least one of brick, stone and rock.

The powdered aggregate forms the externally facing layer of the cladding wrap, that is, the exterior, visible face. Therefore, it is preferable to use a powdered aggregate which is formed from substantially the same material as is already in use on the building to be clad, or on similar buildings in the locale. The majority of buildings requiring renovation are built from brick or stone, and therefore it is advantageous to provide a cladding wrap using at least these components in the powdered aggregate.

Preferably, the powdered aggregate may be bonded to the facing substrate using a polymeric binding agent. Additionally or alternatively, the flexible facing layer may be bonded to the backing layer using a polymeric binding agent.

A polymeric binding agent, in particular a resin-based agent, is advantageous for use in the cladding wrap, since it is sufficiently adhesive to bond the layers together, whilst being sufficiently viscous to permeate through the porous layer. The binding agent is also weather resistant, which is a primary concern for an exterior cladding.

Preferably, the flexible facing layer may be divided into tiles, the tiles being attached to the backing layer is spaced apart relationship.

It is advantageous to provide the flexible facing layer as a plurality of tiles, fashioned to replicate the appearance of bricks or stones, for example, to give the appearance of continuity with the existing aesthetic of the building. Typically, brickwork is arranged in a pyramidal lattice-like configuration, with gaps between each brick of 1 to 2 centimeters.

Preferably, the cladding wrap may further comprise a grouting layer between the tiles. Beneficially, this grouting layer or seam may itself be flexible or elastic enabling deforming without or substantially without cracking or splitting.

Following on from a brickwork arrangement, it is beneficial to maintain the aesthetic of a real brickwork wall by adding a grouting layer in between tiles, since this will further create the illusion that the cladding wrap is in fact a part of the existing building structure. By using grouting for this purpose, rather than traditional cement and/or lime compounds, the dangers of efflorescence and lime bloom are mitigated.

Preferably, the flexible facing substrate may be a woven mesh or matrix. Additionally or alternatively, the flexible backing substrate may be a polymeric mesh or matrix.

The use of a woven material, such as a cotton layer is advantageous, since it is a light and flexible material. Weather resistance is conferred to the flexible facing layer by the powdered aggregate and polymeric binding agent, and it is therefore beneficial to provide a light substrate. A polymeric mesh may be preferable for the backing material, since this will be adhered to a cladding panel or directly to the exterior wall, and therefore strength may be of greater concern than weight.

According to a second aspect of the invention, there is provided a flexible cladding wrap for an exterior wall of a building, the flexible cladding wrap comprising: a facing layer including a flexible facing substrate and powdered aggregate bonded to the facing substrate; and a flexible backing layer including a flexible backing substrate to which the facing layer is attached.

Although it is beneficial that the facing layer is preferably flexible, it may be rigid.

Furthermore, it may additionally or alternatively preferable that the flexible facing substrate is absorbent. In this case, it is beneficial that the flexible facing substrate is at least porous but may not be absorbent. The porosity allows the powdered aggregate composition to at least in part flow into and/or through the apertures and/or fibres in or of the facing substrate, thereby improving binding and thus integration of the two parts.

According to a third aspect of the invention, there is provided a flexible facing layer for a flexible cladding wrap according to the first aspect of the invention, the flexible facing layer comprising a plurality of tiles cut from a single flexible sheet, the flexible sheet being formed from a powdered aggregate bonded to a woven mesh via impregnation with a polymeric binding agent.

It may be advantageous to provide a plurality of tiles to choose from in order to form a flexible facing layer, in order to best match the cladding wrap to the particular building which is being renovated or restored. This may be best achieved by creating a plurality of tiles in advance, which may then be pooled and selected from as desired.

According to a fourth aspect of the invention, there is provided a flexible cladding wrap system for an exterior wall of a building, the system comprising at least one roll of flexible cladding wrap in accordance with the first or second aspects of the invention; an adhesive for affixing the flexible cladding wrap to a supporting structure; and a hardening agent for curing and hardening the flexible cladding wrap once affixed.

Given that the cladding wrap is flexible, it will be appreciated that a hardening agent is or may be required in order to inhibit or prevent damage to the wrap. This would ordinarily be applied at the point of installation, when the cladding wrap has been attached and moulded to the contours of the building. The cladding wrap may be affixed directly to the building, or to any appropriate support, using an adhesive, before the hardening agent is applied.

According to a fifth aspect of the invention, there is provided a method of forming a flexible facing layer for a flexible cladding wrap according to the first aspect of the invention, the method comprising the steps of: a] grinding a solid inorganic material to form a powdered aggregate; b] inserting the powdered aggregate into an aggregate holding tray or box; c] overlaying an absorbent flexible facing substrate onto the powdered aggregate; and d] impregnating the facing substrate with a polymeric binding agent to adhere the powdered aggregate to the facing substrate.

Preferably, the method may further comprise a step e] of cutting the flexible facing layer into a plurality of tiles.

As stated above, it is advantageous to provide a flexible cladding wrap for application to an exterior wall of a building. The method according to the fourth aspect of the invention advantageously provides a simple way of arriving at the flexible facing layer for the flexible cladding wrap in such a way as to be able to select the aesthetic features of the cladding wrap prior to installation. The aesthetics are determined by the powdered aggregate which is utilised in the flexible facing layer, and may be matched to the original brick or stone work either of the building being treated or of the surrounding architecture.

Preferably, the method may further comprise steps: f] soaking the flexible facing layer in water; and g] reheating the flexible facing layer, thereby creating a textured surface of the facing layer.

Whilst powdered aggregate will achieve the correct colour and general appearance so as to appear to blend with the existing material of the building, the age and therefore weathered appearance of the cladding wrap will be clearly different to the building. It is therefore possible to simulate this weathering effect by soaking and drying the flexible facing layer. This process will lead to erosion of the powdered aggregate, and the flexible facing layer can be tailored to look as similar as possible to the existing material.

According to a sixth aspect of the invention, there is provided a method of forming a flexible cladding wrap according to the first aspect of the invention, comprising the steps of: a] forming a flexible facing layer in accordance with the fourth aspect of the invention; b] laying out a flexible backing layer and applying a binding agent to said backing layer; and c] overlaying the flexible facing layer onto the flexible backing layer, the binding agent adhering the flexible facing layer to the flexible backing layer.

According to a seventh aspect of the invention, there is provided a method of forming a flexible cladding wrap according to the first aspect of the invention, comprising the steps of: a] forming a tiled flexible facing layer in accordance with the fourth aspect of the invention; b] laying out a flexible backing layer and applying a binding agent to said backing layer; c] arranging the tiles of the flexible facing layer in a spaced apart configuration on the flexible backing layer, the binding agent adhering the flexible facing layer to the flexible backing layer; d] applying a grouting layer to the spaces between the tiles; and e] applying a further polymeric binding agent to percolate through the flexible facing layer to secure the grouting.

By utilising the flexible facing layer as created according to the fifth aspect of the invention, it is therefore possible to construct a flexible cladding wrap by layering and binding several layers together. This can be done using a uniform flexible facing layer as in the fifth aspect of the invention, or by inserting tiles and grouting as described in the sixth aspect of the invention.

Preferably, the method further comprises step: f] removing a surplus of the grouting following curing of the further polymeric binding agent.

Grouting is liable to leach upon application of the binding agent, and it is therefore advantageous to perform some additional aesthetic refactoring of any grouting following its application.

According to an eighth aspect of the invention, there is provided a method of forming an aesthetically pleasing façade for an exterior wall using a flexible cladding wrap according to the first or second aspects of the invention, comprising the steps of: a] applying an adhesive to the flexible backing layer of the flexible cladding wrap; b] adhering the flexible cladding wrap to a supporting structure; and c] applying a hardening agent to cure and harden the flexible cladding wrap.

Once a flexible cladding wrap has been formed, it is therefore possible to apply it to a building, with or without an intermediate panel, in order to maintain an aesthetic impression. The cladding wrap must be affixed to a support structure, be it directly to the wall, other building surface or otherwise, and then hardened in order to increase its durability and weather resistance.

Preferably, the powdered aggregate used in the flexible cladding wrap may be colour-matched depending on the exterior wall of the building and/or locality of the building.

The colour-matching of the powdered aggregate of the cladding wrap to the exterior wall of the building and/or locality of the building means that the cladding wrap can be readily configured so as to blend into its surroundings, creating a traditional built appearance despite the inclusion of non-traditional insulation materials, for instance.

According to a ninth aspect of the invention, there is provided a flexible cladding wrap for a building panel, the flexible cladding wrap comprising: a flexible facing layer including an absorbent flexible facing substrate and powdered aggregate bonded to the facing substrate; and a flexible backing layer including a flexible backing substrate to which the facing layer is attached.

According to a tenth aspect of the invention, there is provided a building panel comprising a panel body and a flexible cladding wrap in accordance with the ninth aspect of the invention applied to at least one major surface of the panel body.

Preferably, the panel body is or includes concrete. Additionally or alternatively, the building panel is a wall panel.

According to an eleventh aspect of the invention, there is provided a method of forming a building panel in accordance with the tenth aspect of the invention, comprising the steps of: a] locating the flexible cladding wrap in a panel mould; b] inserting flowable panel material of the panel body into the panel mould; c] allowing the flowable panel material to cure; and d] removing the set panel body with the cladding wrap integrally formed thereto from the panel mould.

Preferably, the flowable panel material is or includes concrete. Additionally or alternatively, the method may further comprise a step e] prior to step c] of locating a further flexible cladding wrap in the panel mould to overlie or substantially overlie the flowable panel material.

Furthermore, the flexible cladding wrap may be suitable for any surface of a building element or structure, and therefore in accordance with a twelfth aspect of the invention, there is provided a flexible cladding wrap comprising: a flexible facing layer including an absorbent flexible facing substrate and powdered aggregate bonded to the facing substrate; and a flexible backing layer including a flexible backing substrate to which the facing layer is attached. Preferably, the flexible cladding wrap is specifically adapted for facing a building surface.

According to thirteenth aspect of the invention there is provided a method of forming a flexible facing layer for a flexible cladding wrap according to the first aspect of the invention, comprising the steps of: a] suspending a flexible facing substrate from a supporting framework; b] applying a wet mixture including powdered aggregate and at least one polymer binder to the flexible facing substrate, such that the wet mixture is at least partially suspended from the flexible facing substrate; c] curing the wet mixture on the flexible facing substrate to adhere the two.

Forming the flexible facing layer using a wet mixture of aggregate increases the ease of manufacture and allows for scaling of the production process by way of mechanical spraying or spreading. Furthermore, the wet mixture can include many different aggregates or pigments which may be combined to create any desired colour or texture. Preferably, a plurality of polymer binders is utilised for colour and texture.

Preferably, the step of texturing the suspended wet mixture may also be included. This allows different textures or surface finishes to be applied to the flexible facing layer, which can be made to match pre-existing materials if desired.

In a beneficial arrangement, the flexible facing layer may be cut into a plurality of tiles. The tiles may be shaped so as to match any existing stonework or brickwork.

According to a fourteenth aspect of the invention there is provided a method of forming a flexible cladding wrap in accordance with the first aspect of the invention, comprising the steps of: a] forming a flexible facing layer according to the thirteenth aspect of the invention; b] laying out the flexible facing layer; c] overlaying a flexible backing substrate and applying a binding agent to said backing layer, the binding agent adhering the flexible facing layer to the flexible backing layer.

According to a fifteenth aspect of the invention, there is provided a method of forming a flexible cladding wrap in accordance with the first aspect of the invention, comprising the steps of: a] forming a tiled flexible facing layer in accordance with the thirteenth aspect of the invention; b] arranging the tiles of the flexible facing layer in a spaced apart configuration; c] overlaying the flexible backing layer and applying a binding agent through said flexible backing layer.

This allows the tiles to be arranged in any desired manner, so as to match a particular bond of brickwork, for instance, or to better emulate a desired appearance. Applying the binding agent through the flexible backing layer also ensures easy manufacture.

Preferably, a filler may be applied to spaces between the tiles. A filler, such as a grouting composition, occludes or fills the gaps between the tiles and improves the aesthetics of the finished product.

More preferably, the filler may be a polymeric grouting filler. Such a polymeric grouting filler removes the need for any further binding agent and further improves flexibility of the flexible cladding wrap.

Optionally, a further polymeric binding agent may be applied to percolate through the flexible facing layer to secure the filler.

The invention will now be more particularly described, by way of example only, with reference to the accompanying drawings, in which.

Figure 1:
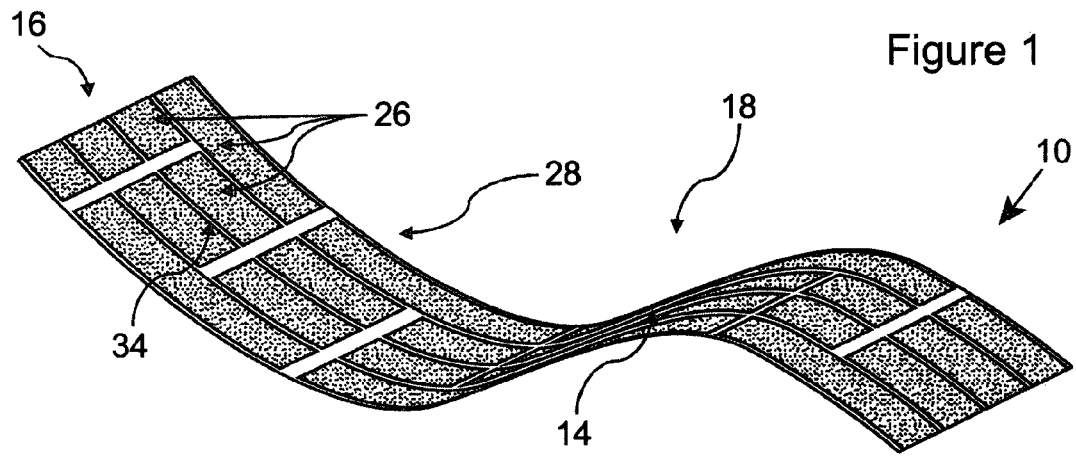
FIG. 1 shows a perspective representation of an embodiment of a flexible cladding wrap according to the invention.
Figure 2:
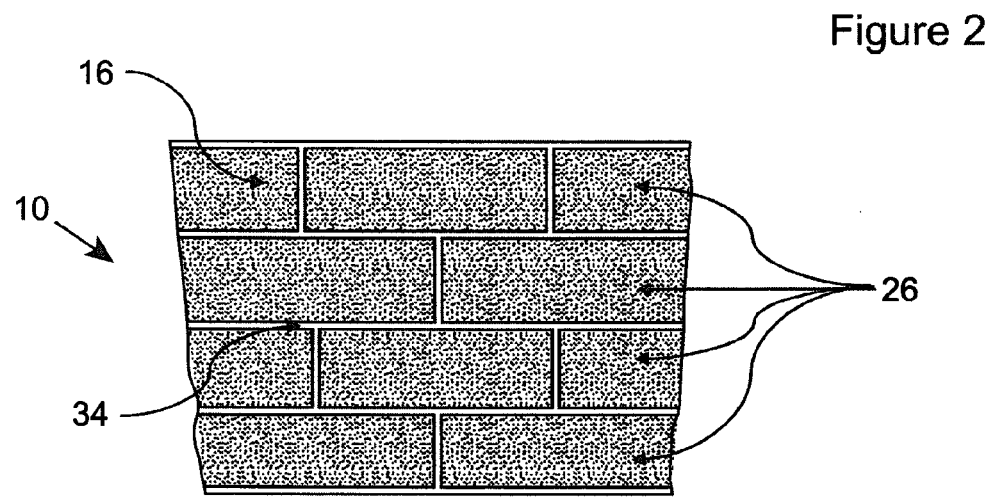
FIG. 2 shows a side view of the flexible cladding wrap of FIG. 1.
Figure 3:
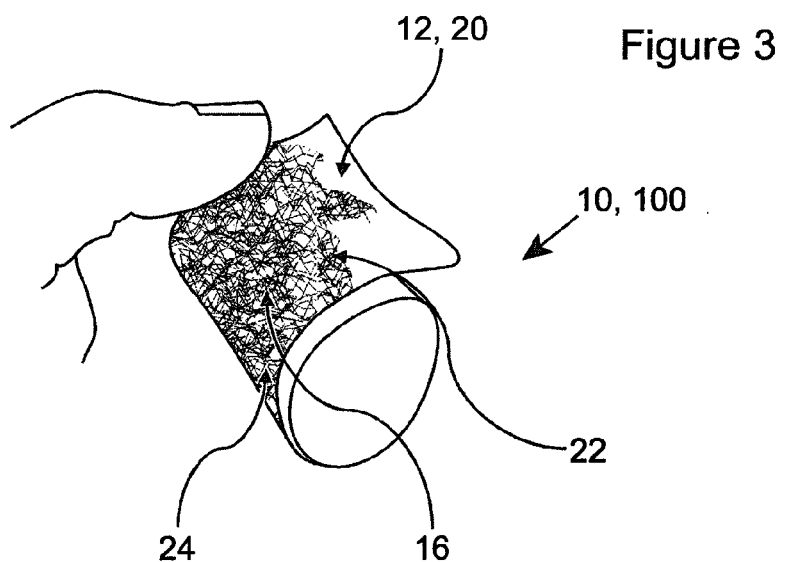
FIG. 3 shows the flexible cladding wrap of FIG. 1 in a rolled configuration.

Referring to the accompanying drawings and particularly initially to FIGS. 1 to 3, there is shown a flexible cladding wrap which is specifically adapted for facing a building surface and, in this embodiment, suitable for an outer surface of an exterior wall of a building, indicated globally at 10. Although an exterior wall surface is suggested, the flexible cladding wrap may also be utilised to face an internal wall surface. The cladding wrap 10 comprises two layers which are adhered to one another; a flexible backing layer 12 which forms a wall-facing surface 14 of the cladding wrap 10, and a flexible facing layer 16, which forms an external surface 18 of the cladding wrap 10 when installed. In this embodiment, the facing layer 16 is flexible. However, in other embodiments, the facing layer 16 may be rigid or substantially rigid once cured. Typically, the cladding wrap 10 will have a thickness of, but not necessarily limited to, the order of 1 to 15 mm, in order to retain the flexibility of the component layers 12, 16.

The flexible backing layer 12 comprises a flexible backing substrate 20. This substrate 20 is at least partially porous, typically being a polymeric matrix, for instance, a polypropylene mesh.

The flexible facing layer 16 includes a, preferably absorbent and more preferably porous, flexible facing substrate 22 and a powdered aggregate 24 which is bonded to the facing substrate 22. The facing substrate 22 is preferably a woven material, such as an absorbent cotton mesh. The most important properties of said substrate 22 are its flexibility and that it is porous, thereby allowing percolation of a binding agent therethrough.

The flexible facing layer 16 will generally take the form of a plurality of tiles 26 arranged in sequence to resemble the external appearance of the wall to which the cladding wrap 10 will be affixed.

The powdered aggregate 24 is formed from recycled castoff solid inorganic material, typically comprising at least one of brick, stone or rock. Said material will be chosen primarily for its aesthetic appeal, so as to match the external appearance of the building to which it is being affixed. For example, brick and/or sandstone aggregates might be common choices for the aggregate 24.

To achieve the desired finish, thereby allowing matching or substantial matching to the building's local, historic or architectural environment and/or its original finish, the powdered aggregate 24 may be colour-matched using a system similar to that used for colour matching paint or other liquid coating products. In this way, during formation of the powdered aggregate 24, the correct colour and texture of materials can be chosen to produce the required finish.

Additionally, more than one different type of powdered aggregate 24 may be utilised, thereby enabling a base colour or appearance with patches 28 of weathering or other random anomalies appearing thereon, such as in-grained dirt or other particulate debris or detritus which ordinarily build up through years of standing in the open environment and being subjected to all kinds of weather.

Prior to curing the powdered aggregate 24, mechanical marking may also be utilised to enhance realism. For example, striation marks may be applied via a scraping device to impart peaks and troughs across an outer surface replicating slicing by a mechanical cutter.

The aggregate 24 is bonded to the facing substrate 22 using a polymeric binding agent 30, typically a resinous compound. The backing and facing layers 12, 16 may also be bound together using a polymeric binding agent 32. See FIG. 7. This may or may not be the same compound as used to bond the aggregate 24 to the facing substrate 22.

If the flexible facing layer 16 is provided as spaced-apart tiles 26, a filler, such as a grouting layer 34, will also be provided in the spaces 36 between the tiles 26. Said grouting layer 34 is bonded to the flexible facing layer 16 again using a polymeric binding agent, which will typically be the same compound as is used to bind the other layers together. The grouting layer 34 may be flexible and/or elastic, to accommodate in use flexion of the facing layer 16.

Figure 4:
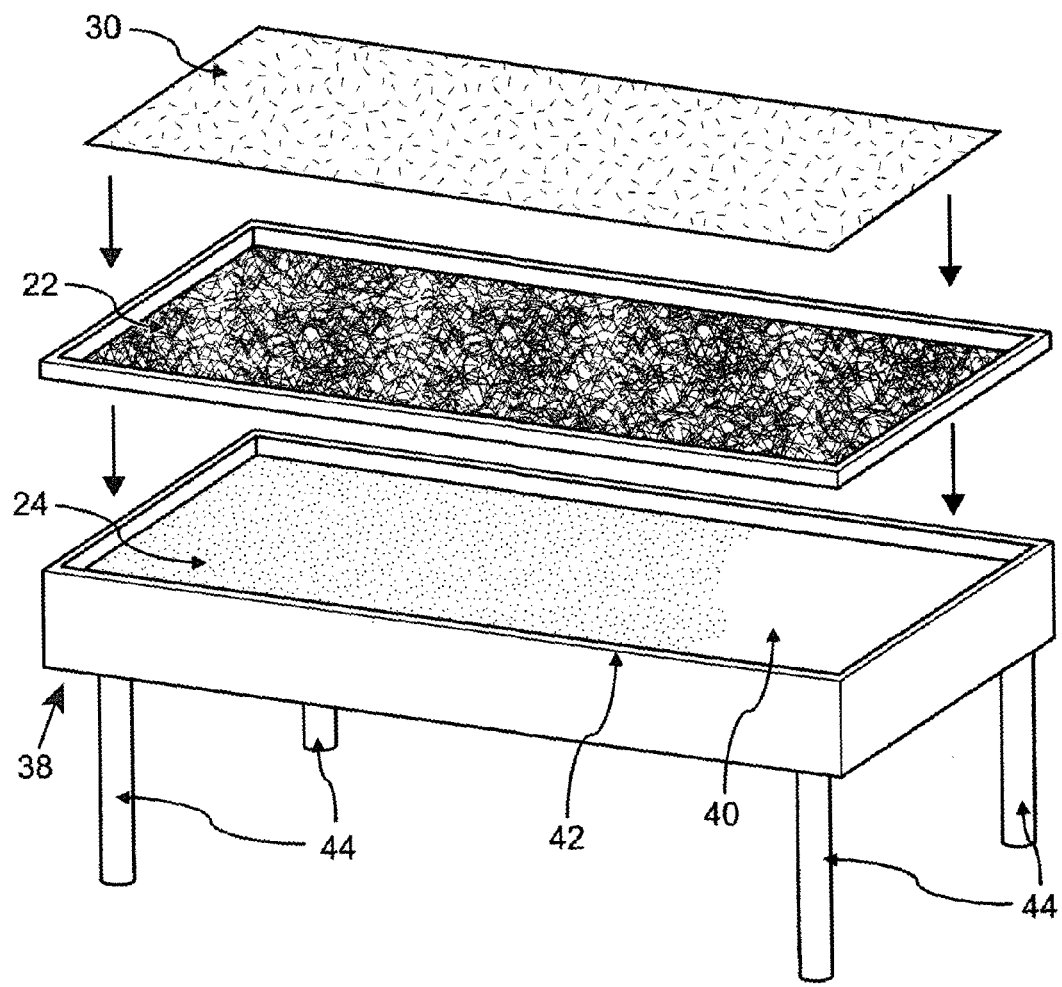
FIG. 4 is a diagrammatic representation of a method of forming a flexible facing layer of the flexible cladding wrap, in accordance with the fifth aspect of the invention.

To create such a flexible cladding wrap 10, by way of one non-limiting example only, there is provided an aggregate holding device 38, shown in FIG. 4, being a structure having a rectangular upper surface 40 having an upwardly projecting perimeter wall 42 defining a retaining area for the powdered aggregate 24, and a plurality of supporting legs 44 to elevate the upper surface 40 from ground level. The upper portion of the aggregate holding device 38 may be removed from the supporting legs 44 to provide an aggregate holding tray or box 46, from which a finished cladding wrap 10 can be easily removed.

By way of indication, the aggregate holding tray 46 has typical dimensions of 6 foot (1.83 meters) by 3 foot (0.91 meters) by 8 inches (0.2 meter), and a generated cladding wrap 10 therefrom will have an area of 6 foot (1.83 meters) by 3 foot (0.91 meters), typically having a thickness of up to around 0.625 inches (0.016 meter). These dimensions are for illustrative purposes only, and a said cladding wrap of any dimension can feasibly be made.

The powdered aggregate 24 is placed into the aggregate holding tray 46 and dispersed so as to form an even layer on the upper surface 40. Over the aggregate 24 is then positioned the flexible facing substrate 22, cut to size to fit into the aggregate holding tray 46, and then the polymeric binding agent 30 is applied over the flexible facing substrate 22.

The polymeric binding agent 30 will percolate through the porous facing substrate 22, soaking through and penetrating the powdered aggregate 24. Heat and air are then applied to the assembly, which will form the flexible facing layer 16, thereby curing the polymeric binding agent 30 and binding the powdered aggregate 24 to the flexible facing substrate 22.

Figure 5:
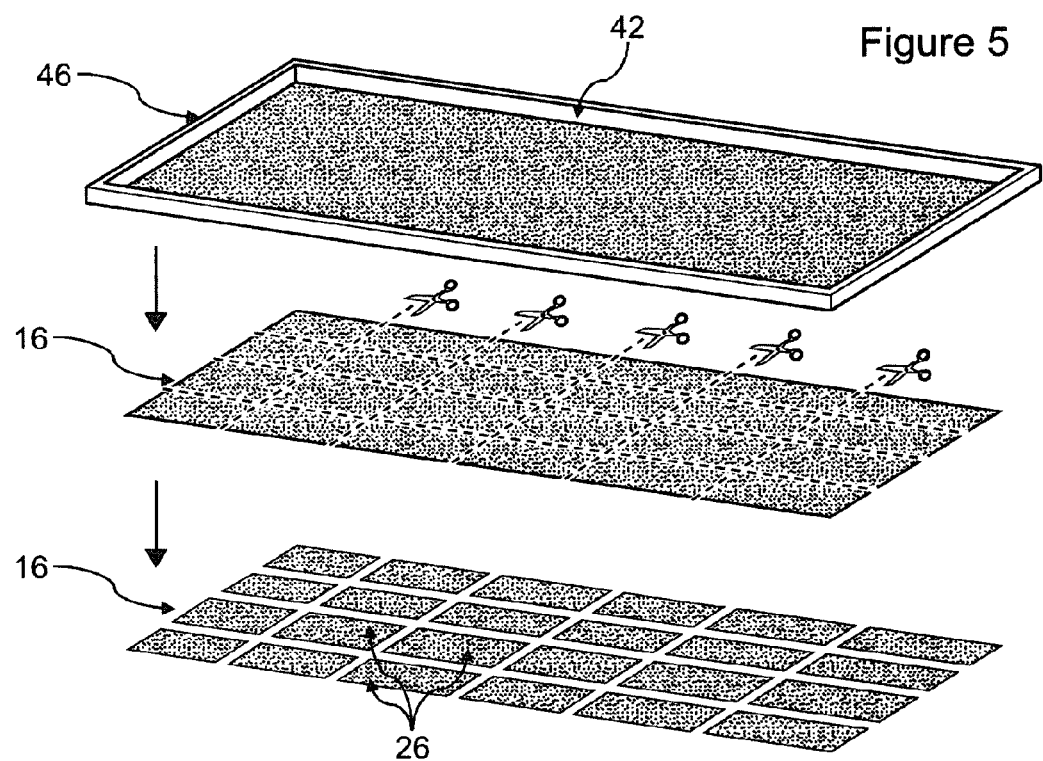
FIG. 5 is a diagrammatic representation of preferable further steps of the method, as shown in FIG. 4.

Upon curing, a flexible facing layer 16 is thus formed. This will have the aesthetic appearance of whichever material was used to form the powdered aggregate 24. Typically, buildings do not have a uniform external appearance, particularly historical buildings, and as such, the flexible facing layer 16 may be cut into tiles 26 to suit the external appearance of the particular building. As shown in FIG. 5, this may be a series of tiles which have regular dimensions, and in the present embodiment of the invention, said tiles 26 are designed to have the appearance of bricks.

At this stage, it is advisable to perform any additional work to the tiles 26 as is necessary to improve their aesthetic appearance so as to naturally blend with the exterior wall of the building to which the cladding wrap 10 is to be applied. Such work could be, but is not limited to, smoothing or weathering the surfaces of the tiles 26, reshaping particular tiles 26 in order to match the present exterior surface of the building, or adding surface detail to each or particular tiles 26.

To achieve a weathered look, each tile 26 may be soaked in water and reheated to create a natural surface finish. This could alternatively be performed on the flexible facing layer 16 prior to cutting into individual tiles 26.

Once a desired look or appearance of the tiles 26 has been achieved, the flexible cladding wrap 10 can be formed. This is achieved by attaching the flexible facing layer 16 to the flexible backing layer 12.

Figure 6:
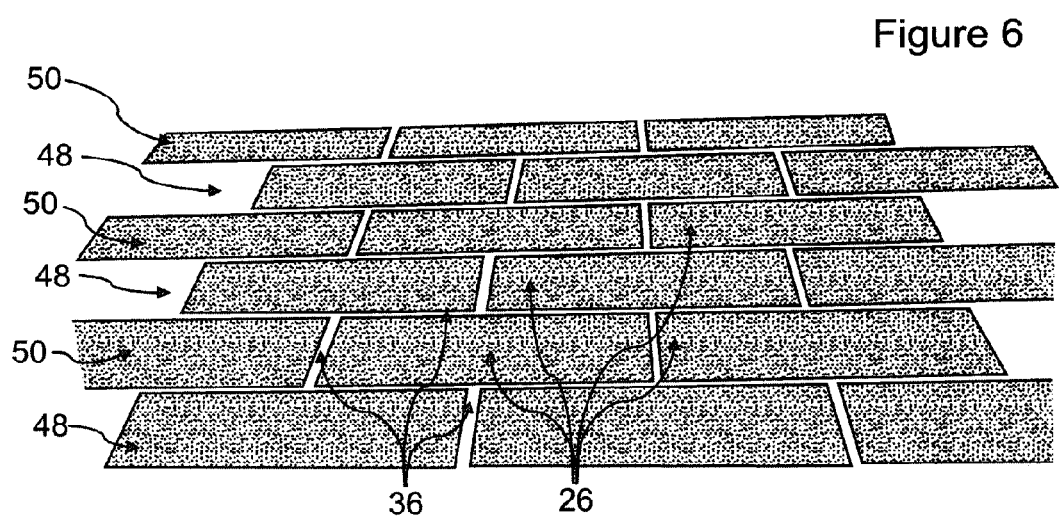
FIG. 6 shows a perspective view of a preferred arrangement of tiles of a flexible facing layer, in accordance with the third aspect of the invention.

The flexible facing layer 16 is first arranged in the aggregate holding device 38. If the flexible facing layer 16 is a unitary sheet, then this is straightforward, but if it has been divided into tiles 26, then the tiles 26 must be arranged in the desired configuration, such as that shown in FIG. 6. For instance, if replicating brickwork, this may involve stacking the tiles 26 in pyramidally stacked layers, with even and odd layers 48, 50 being horizontally offset to one another by the length of half or 50% of a tile 26.

Figure 7:
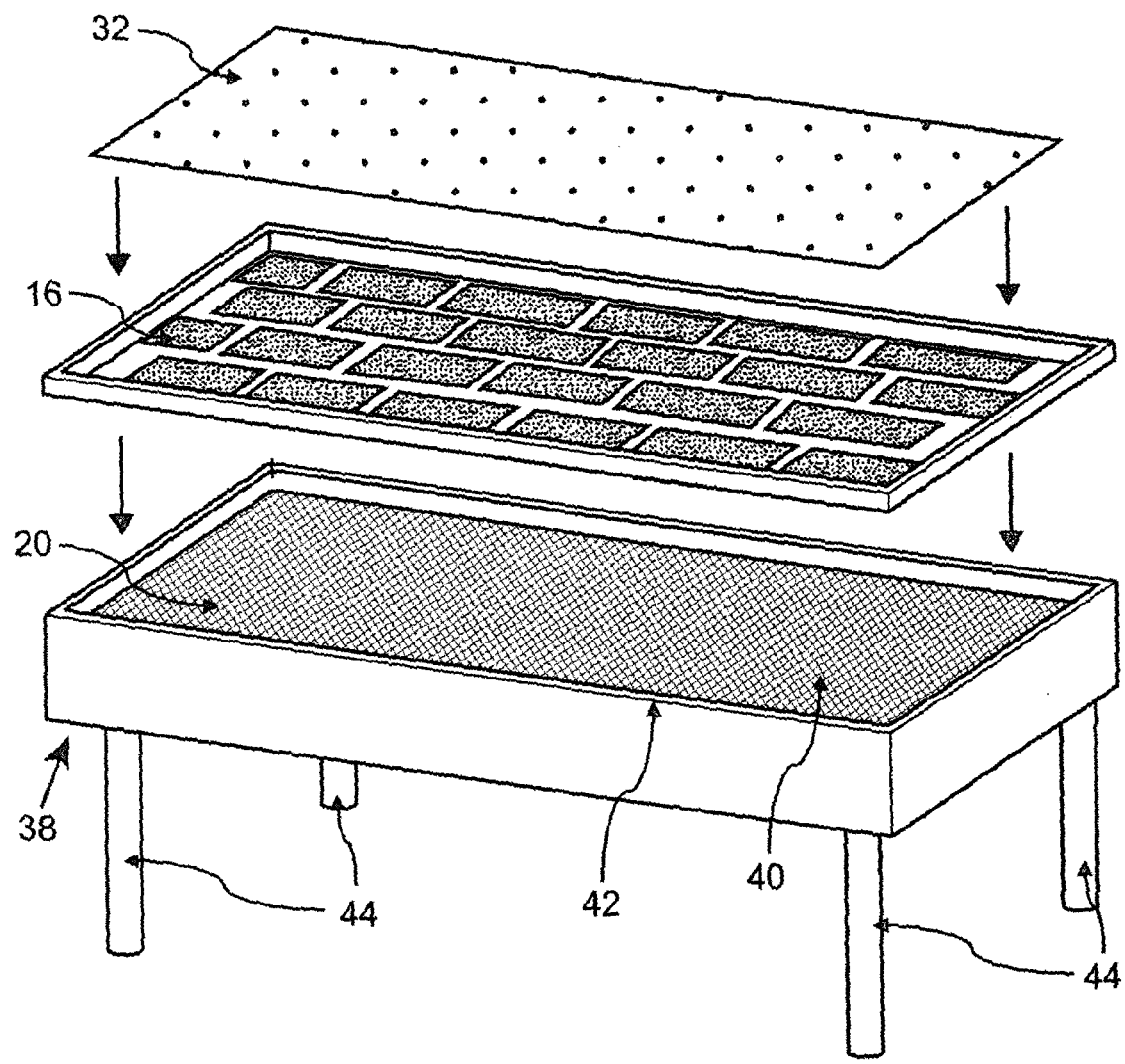
FIG. 7 is a diagrammatic representation of a method of forming a flexible cladding wrap, in accordance with the sixth aspect of the invention.
Figure 8:
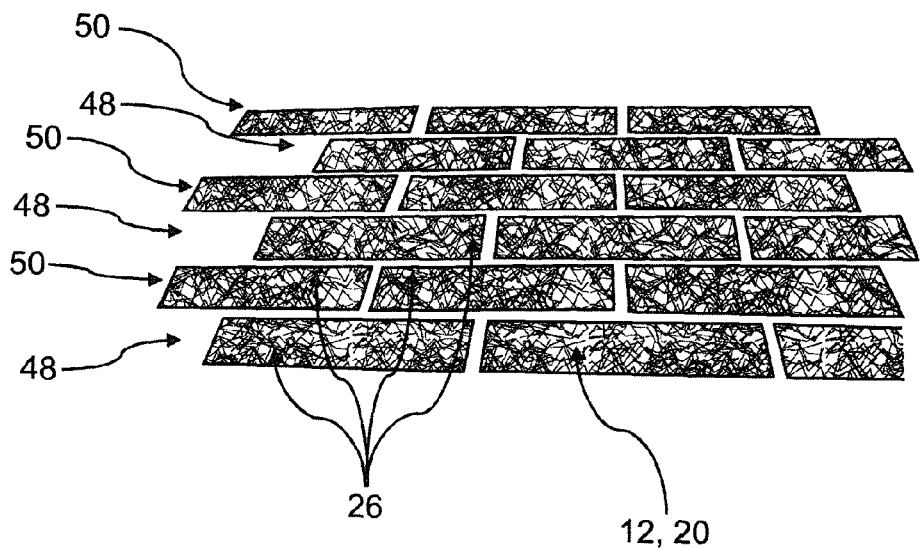
FIG. 8 shows a perspective view of a preferred arrangement of an assembly of a flexible backing layer and a flexible facing layer of the flexible cladding wrap for use in the method as shown in FIG. 7.

Once the desired configuration is achieved, the flexible backing substrate 20 is overlain, and the polymeric binding agent 32 is applied to the assembly, shown in FIGS. 7 and 8. Again, heat and air are applied, curing the polymeric binding agent 32 and secured the backing and facing layers 12, 16 to one another.

Figure 9:
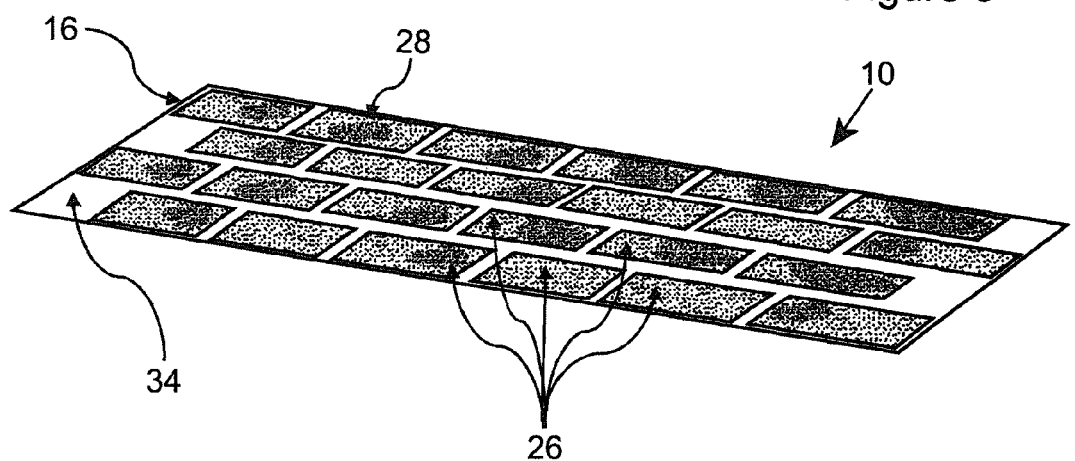
FIG. 9 shows a perspective view of a flexible cladding wrap formed via a method in accordance with the seventh aspect of the invention.

If a grouting layer 34 is to be included, then a similar process needs to occur. The grouting layer 34 is applied to the spaces 36 between the tiles 26, and a polymeric binding agent is applied, heated, and allowed to cure, thereby fixing the grouting 34 into position. Excess grouting 34 may then be removed from the cladding wrap 10, for instance, using an abrasive means such as sandpaper. A flexible cladding wrap 10 formed with a grouting layer 34 is shown in FIG. 9.

Evidently, it is entirely possible to perform the above steps in a single procedure; the tiles 26 can be arranged and the grouting layer 34 simultaneously applied, before applying a single polymeric binding agent 32. Alternatively, the grouting layer 34 could be applied subsequently to the application of the polymeric binding agent 32, but before it has cured.

Having created the flexible cladding wrap 10, it can therefore be used in a variety of applications which utilise its flexibility. Purely from a transportation perspective, the flexible cladding wrap 10 is capable of being rolled up into a convenient tube-like configuration 100, as shown in FIG. 3. This allows the cladding wrap 10 to be transported and applied in a manner akin to the application of wallpaper.

During installation of the flexible cladding wrap 10, the roll 100 can be unfurled and cut to size. An adhesive can then be applied to the wall-facing surface 14 or other support to which the cladding wrap 10 is to be affixed, and then the cladding wrap 10 can be installed. The cladding wrap 10 is smoothed so as to follow the contours of its support, eliminating any air pockets which may have formed between the support and the wall-facing surface 14 during installation, and the adhesive allowed to dry.

At this stage, the cladding wrap 10 is therefore affixed in position, but is still relatively fragile. As such, a hardening agent is or may be applied to the external surface 18 of the cladding wrap 10, which impregnates the flexible facing layer 16; hardening and increasing the weather-resistance of the cladding wrap 10. The hardening agent is allowed to set, completing the installation process.

In this case, the flexible cladding wrap is as described above, and in this example is provided in the mould of a panel body of the building wall panel, with the rearmost surface facing upwards. Flowable panel material, which may be or include concrete and which forms the panel body, is then inserted into the mould to overlie the flexible cladding wrap. Once cured or set, the panel body can be removed with the flexible cladding panel bonded monolithically or integrally formed therewith to face one major surface.

Optionally, a further flexible cladding wrap may be incorporated by being inserted into the mould to overlie the flowable panel material once poured. In this case, once set and removed, the panel body is faced on its two major surfaces with the integrated flexible cladding wraps.

Figure 10:
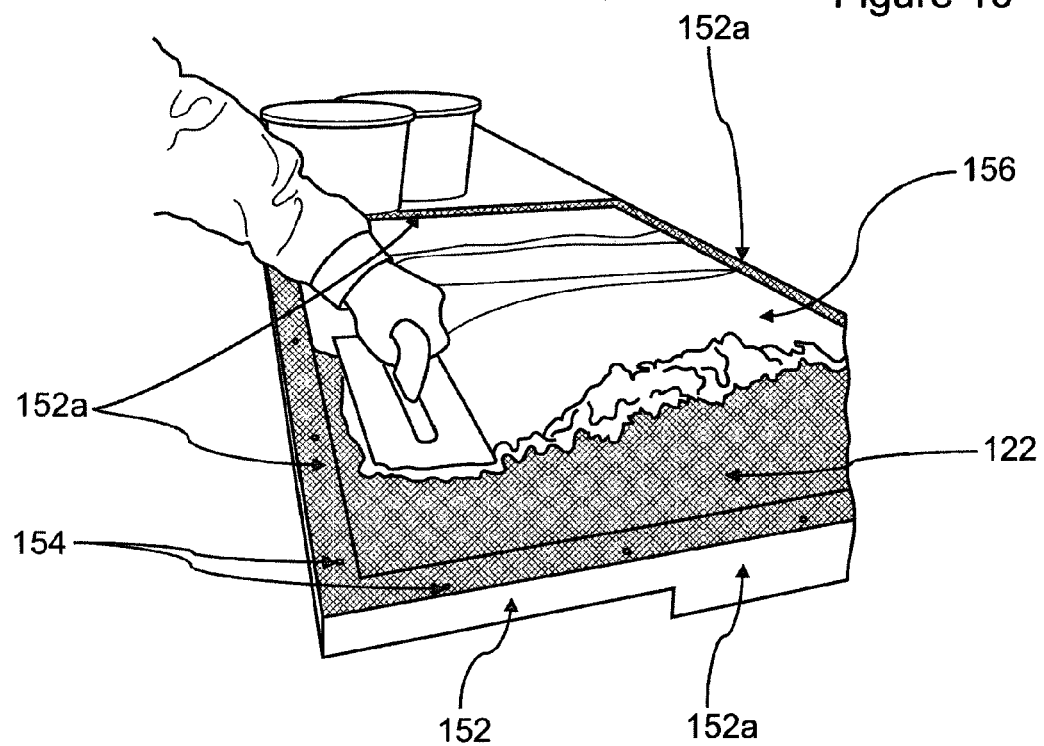
FIG. 10 shows a perspective view of a wet mixture being applied to a flexible facing substrate to form a flexible or non-flexible facing layer, in accordance with the invention.

A second method of manufacturing a flexible cladding wrap 110 is depicted in FIGS. 10 to 15. In each of these Figures, similar or like features to those of the preceding embodiments are given similar or like references. Referring firstly to FIG. 10, a flexible facing substrate 122 may be hung or stretched over a supporting framework 152. The supporting framework 152 depicted comprises four wooden frame elements 152a, arranged to form the substantially rectangular supporting framework 152. The flexible facing substrate 122, which may preferably comprise at least polypropylene mesh, is attachable to the supporting framework 152 such that the flexible facing substrate 122 is held in place during a portion of the manufacturing process, but may be removed from the supporting framework 152 once it is no longer necessary. Attachments 154, which in this case are nails, may include staples, and/or other such attachment means in place of, or in addition to, nails.

A wet mixture 156 is then applied to the flexible facing substrate 122. The wet mixture 156 comprises one or a variety of wet and dry powdered, preferably recycled, aggregates mixed with polymer binders, the choice of which may be varied to alter the colour and texture of the mixture 156. The mixture 156 may also include one or more liquid pigments for recreation of different colours. This wet mixture 156 may be applied to the flexible facing substrate 122 by way of spreading, pouring, spraying, or other such application method, to create a flexible facing layer 116.

For additional benefits, one or more geopolymers may be used, which are generally for example alumino-silicates. These geopolymers lower the carbon-footprint of the material manufacture due to their manufacture from minimally processed natural materials or industrial by-products.

The mixture 156 may beneficially have fire-retardant properties, be permeable, and/or be water repellent, each of which may increase the longevity of the resulting flexible cladding wrap 110. The mixture 156 may also be formulated to match old or new brick and stone stock, which allows the cladding material or wrap 110 to be used in addition to, or in place of, naturally occurring brick and stonework, for enhanced aesthetics.

The application of the wet mixture 156 to the flexible facing substrate 122 forces at least a portion of the wet mixture 156 through the flexible facing substrate 122, forming an at least partially suspended mixture 158. The suspended mixture 158 may then be textured or shaped by use of a mould, or other instrument, in situ, to produce the desired surface finish. Moulding or texturing enables the flexible cladding wrap 110 to even further replicate a natural finish, which may be preferable.

Figure 11:
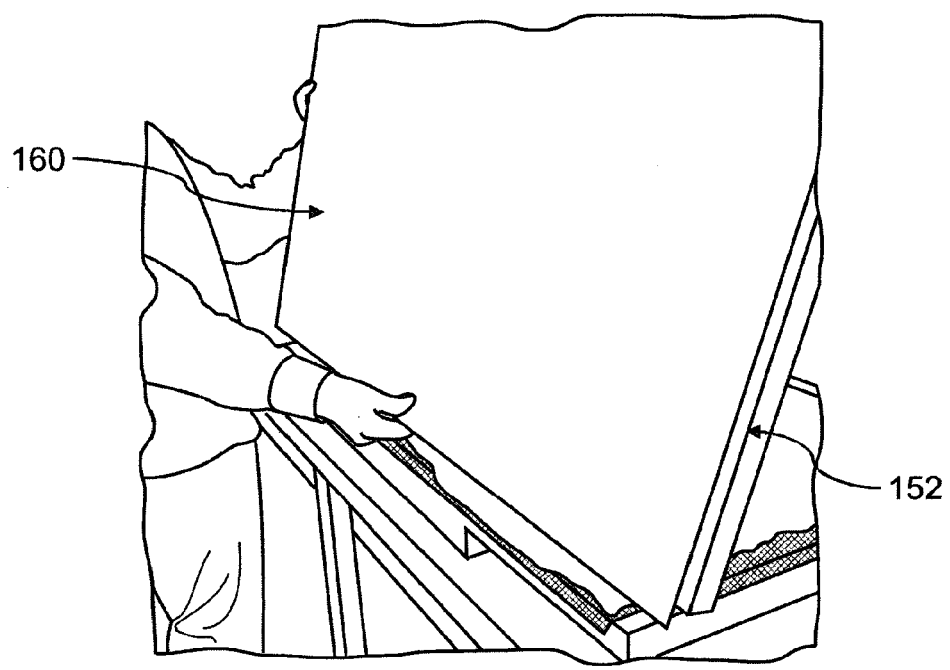
FIG. 11 shows a perspective view of the flexible facing layer of FIG. 10, with a backing surface applied, being inverted.
Figure 12:
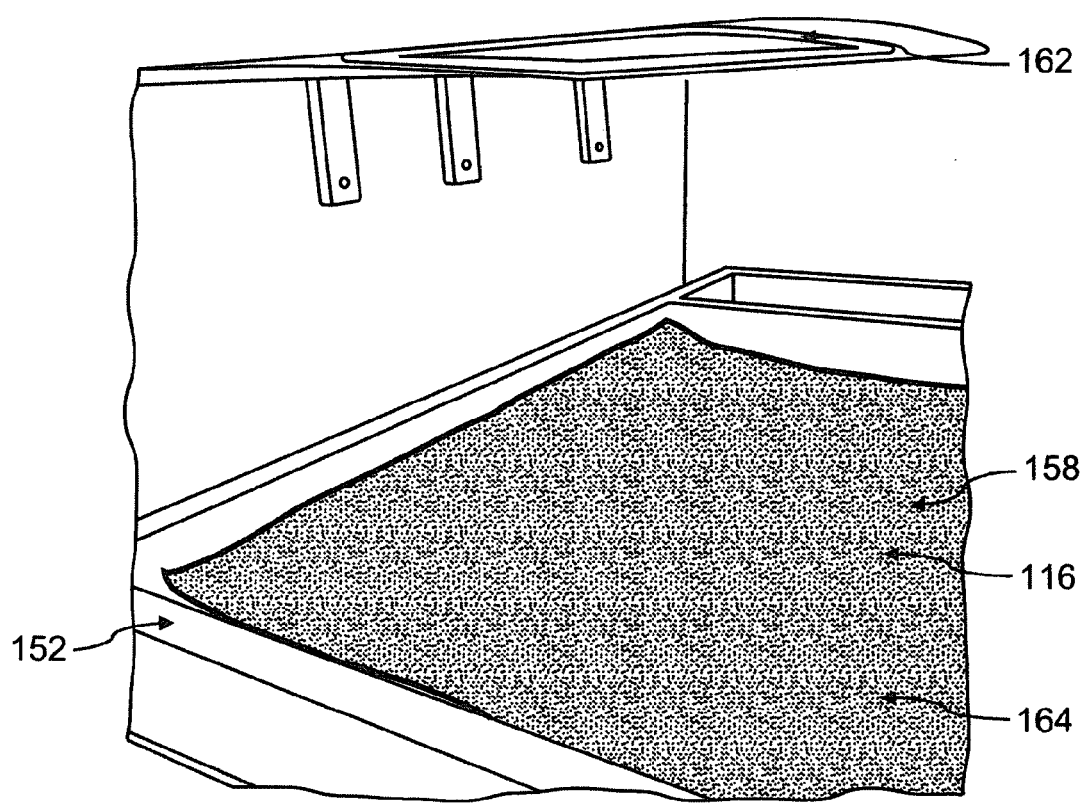
FIG. 12 shows a perspective view of the inverted flexible facing layer of FIGS. 10 and 11 being cured by a curing means.
Figure 13:
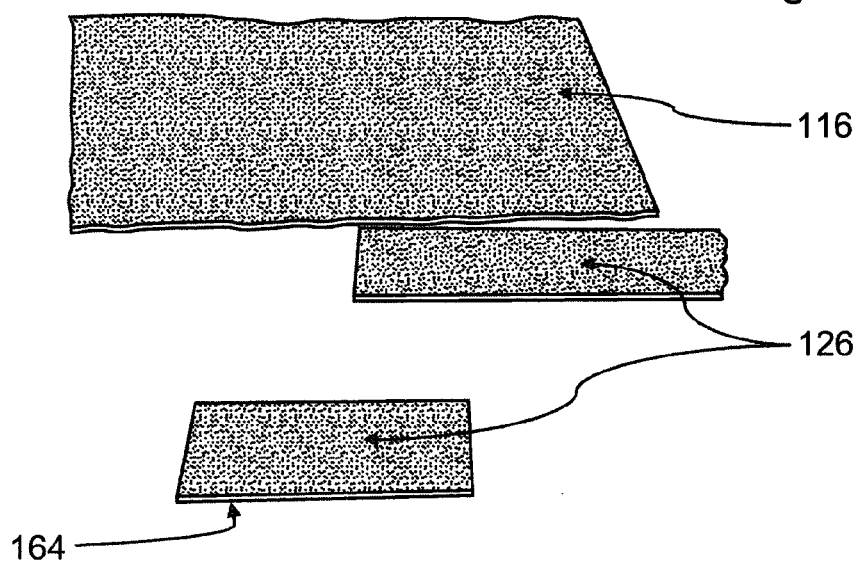
FIG. 13 shows a perspective view of the flexible facing layer of FIG. 12 cut into separate brick-like tiles, ready for further processing.
Figure 14:
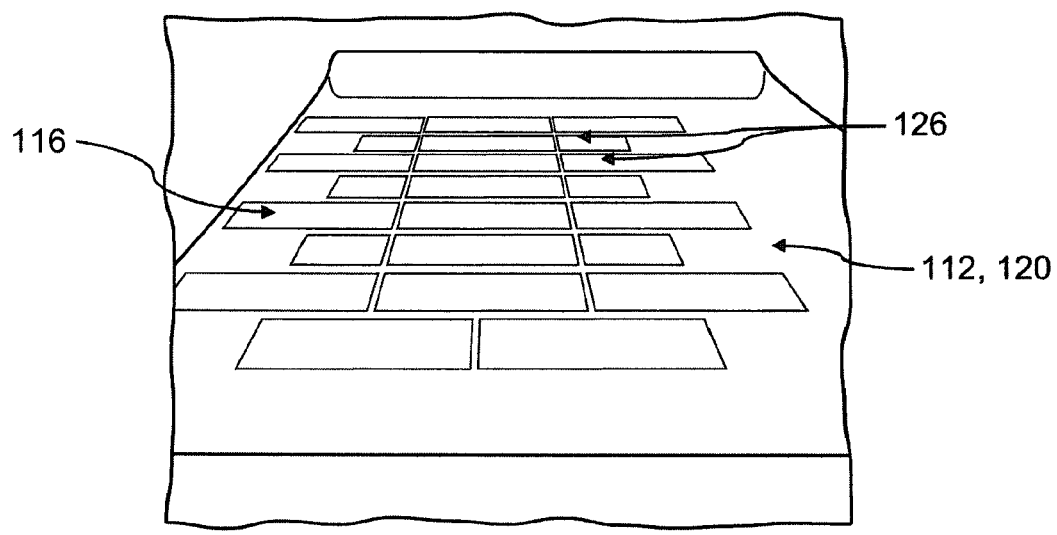
FIG. 14 shows a perspective view of the tiles of FIG. 13 being mounted to a flexible backing layer, in accordance with the invention.
Figure 15:
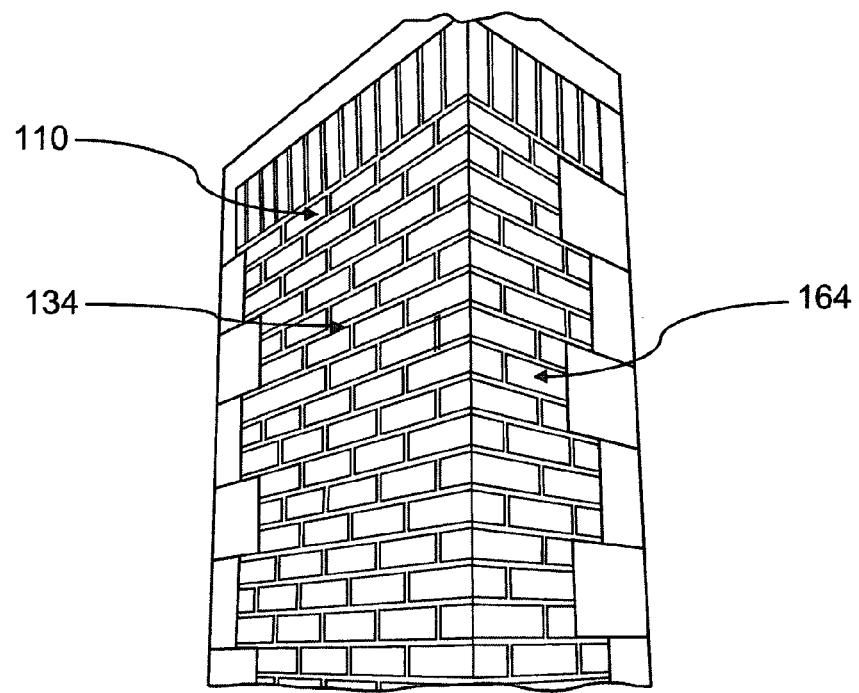
FIG. 15 shows a perspective view of the flexible cladding wrap of FIG. 14 mounted to a wall, with a grouting layer between tiles.

A holding plate 160 may then be placed over the top of the flexible facing layer 116, as shown in FIG. 11, before the flexible facing layer 116, which is flexible at this stage in the process, is inverted ready for curing, with the previously suspended mixture 158 now exposed. FIG. 12 depicts the flexible facing layer 116 being exposed to a curing means, which in this case is one or more infrared heat lamps 162. The infrared heat lamp 162 results in removal of moisture from or through the flexible facing substrate 122 in order to harden, or cure, the flexible facing layer 116.

Once fully cured, the flexible facing layer 116 may be cut or otherwise formed into individual tiles 126. Depending on the desired finished product, the tiles 126 may be rectangular in order to simulate the normal shape of a clay brick, or any other shape if it is desired to emulate differently-shaped bricks, stones or other such building materials.

The tiles 126 may then be laid out in a desired arrangement on a surface, with their textured surface 164 facing down, in order that a flexible backing layer 112 may be overlaid. The flexible backing layer 112 comprises a flexible backing substrate 120 which in this case is perforated. A suitable binding agent, such as a polymer glue or adhesive, is then applied through the flexible backing layer 112 and cured in order to bond the facing layer 116 to the backing layer 112, resulting in the formation of the flexible cladding wrap 110. The desired arrangement may be any formation or bond including, but not limited to, Flemish bond, English bond, or traditional stretcher bond. The particular bond or formation used will be dependent on the desired aesthetics or whether the flexible cladding wrap 110 is required to match previous brick- or stone-work.

The flexible cladding wrap 110 may then be installed on a wall or other surface by use of a strong adhesive, such as brick adhesive. It is advantageous for this adhesive to also act as a grouting layer or filler 134, however grouting 134 or other filler may be otherwise applied to the flexible cladding wrap 110 as a separate element, during either manufacture or installation. The grouting layer 134 or adhesive, which is preferably a polymer acrylic adhesive or grout 134, such that flexibility may be retained, may be applied onto the flexible backing substrate 120, creating a seamless finish. One example of a suitable adhesive is Mapei® 'Fix and Grout', available from Mapei UK Ltd of Mapei House, Steel Park Road, Halesowen, West Midlands, B62 8HD, UK.

It will be appreciated that the form of the support to which the flexible cladding wrap is applied is entirely context dependent. Under certain circumstances, it may be preferable to apply the cladding wrap directly to a wall of the building; under others, the cladding wrap may be more appropriately affixed to a panel or façade prior to installation. The present invention does not seek to discriminate between either of these methods of use.

Furthermore, should the cladding wrap be applied to a panel or façade, it is possible to integrate extra materials in between the support and the cladding wrap, for instance, to improve the thermally insulative properties of the system. One or more further dedicated or specific thermally insulative boards, for example, formed of mineral wool or polystyrene may be provided at a rear of the backing layer, using suitable fastening means such as bonding.

In addition, whilst the backing layer and facing layer are main layers of the flexible cladding wrap, additional layers may be utilised between the two. These layers may include further protective layers to provide enhanced protection against the elements, or may otherwise give, for example, better thermally insulative properties than the backing and facing layers when used alone.

The list of possible materials for powdered aggregate detailed above is non-exhaustive, and will also be context dependent. The powdered aggregate will be specifically chosen so as to match the material used in construction of the building, or buildings in the locale. The aesthetic effect is the important feature, rather than any particular structural property of the base material.

The production process of the flexible cladding wrap can be automated on a production line, or can be performed manually. It may for instance be desirable to mass-produce a majority of tiles, but to manually create a minority of tiles in order to suit the appearance of a particular building.

It will also be appreciated that the flexible cladding wrap may be utilised for covering or overlying other or any suitable building surface. As such, the flexible cladding wrap may be provided on a building wall panel so as to be integral therewith. In particular, having the flexible cladding wrap integrally formed as part of a wall panel, and more particularly as part of a, preferably lightweight structural, concrete wall panel, is beneficial. Lightweight structural concrete wall panels are well known in the field, and therefore further detailed description will be omitted.

Although the flexible facing substrate is absorbent in the above embodiments, it may be beneficial that the flexible facing substrate is at least porous but may not be absorbent. The porosity allows the powdered aggregate composition to at least in part flow into and/or through the apertures and/or fibres in or of the facing substrate, thereby improving binding and thus integration of the two parts.

Additionally or alternatively, the facing layer may be rigid instead of flexible, but this may potentially impact the conformance of the wrap to a more uneven surface.

In the above two alternatives, one or more features of the preceding embodiments may be utilised alone or in any combination, as required.

Whilst described as two separate processes, it is foreseen that the steps of the methods of creating a flexible facing layer and flexible cladding wrap may be used in any combination, where feasible, in order to create hybrid processes or methods.

It is therefore possible to provide a flexible cladding wrap for an external wall of a building, a building wall panel, or any suitable building surface such as an internal wall or surface, floor surface and/or ceiling surface, and which is able to provide aesthetic continuity between the existing wall of the building and the cladding wrap.

By providing a flexible cladding wrap, the effect can therefore be provided to numerous surfaces which previously would not have been capable of accepting paneled cladding due to the unusual contouring of the external wall of the building.

The method in which the flexible wrap is created also allows for the formation of tile effects that are capable of mimicking brick- or stone-work, whilst still retaining the necessary flexibility.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. A method of forming a visible flexible facing layer for altering or creating the appearance of an exterior wall of a building, the method comprising the steps of: a] providing an absorbent flexible facing substrate on a support; b] creating a wet mixture using a powdered aggregate being at least in part solid material and mixed with a polymeric binding agent; c] applying the wet mixture to the flexible facing substrate; and d] by applying heat and air to maintain porosity and flexibility, curing the wet mixture in a tiled brick- or stone-work effect to form the flexible facing layer.

2. The method as claimed in claim 1, wherein, in step b], the wet mixture is colour-matched and/or texture-matched depending on the exterior wall of the building and/or locality of the building.

3. The method as claimed in claim 1, wherein, in step b], more than one different type of powdered aggregate is utilised to enable a base appearance with anomalous patches.

4. The method as claimed in claim 1, further comprising a step e] subsequent to step d] of applying one or more mechanical markings to the cured wet mixture.

5. The method as claimed in claim 1, further comprising a step f] subsequent to step d] of soaking the flexible facing layer in water; and a step g] subsequent to step f] of reheating the flexible facing layer, thereby creating a weather-textured surface of the facing layer.

6. The method as claimed in claim 1, further comprising a step h] subsequent to step c] of applying a flexible and/or elastic grouting layer to the flexible facing layer so as to enhance the tiled brick- or stone-work effect in step d].

7. The method as claimed in claim 6, further comprising a step i] subsequent to step d] of removing a surplus of the grouting layer following curing of the wet mixture.

* * * * *